US008646833B2

(12) United States Patent
Fujii et al.

(10) Patent No.: US 8,646,833 B2
(45) Date of Patent: Feb. 11, 2014

(54) VEHICLE BODY STRUCTURE

(75) Inventors: Takayuki Fujii, Wako (JP); Masayo Akiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 486 days.

(21) Appl. No.: 12/869,236

(22) Filed: Aug. 26, 2010

(65) Prior Publication Data

US 2011/0049937 A1 Mar. 3, 2011

(30) Foreign Application Priority Data

Aug. 27, 2009 (JP) ................................ 2009-196890
Aug. 27, 2009 (JP) ................................ 2009-197005
Aug. 27, 2009 (JP) ................................ 2009-197038

(51) Int. Cl.
*B62D 21/02* (2006.01)

(52) U.S. Cl.
USPC ....... 296/209; 296/205; 296/187.08; 296/204

(58) Field of Classification Search
USPC ............. 296/203.01, 203.03, 193.07, 193.05, 296/209, 187.08, 187.12, 204, 205
See application file for complete search history.

(56) References Cited

U.S. PATENT DOCUMENTS

| 5,560,674 | A * | 10/1996 | Tazaki et al. | 296/193.01 |
| 6,267,439 | B1 * | 7/2001 | Aoyama | 296/203.03 |
| 7,380,830 | B2 * | 6/2008 | Mitsui et al. | 280/784 |

FOREIGN PATENT DOCUMENTS

| JP | 58-149259 | 10/1983 |
| JP | 63-152781 | 10/1988 |
| JP | 63-269787 | 11/1988 |
| JP | 04-23585 | 2/1992 |
| JP | 04-126684 | 4/1992 |
| JP | 07-089464 | 4/1995 |
| JP | 08-175429 | 7/1996 |
| JP | 11-235984 | 8/1999 |
| JP | 2008-189137 | 8/2008 |

OTHER PUBLICATIONS

Japanese Office Action with partial English translation, Application No. 2009-196890, Dated Apr. 2, 2013, 6 pages.
Japanese Office Action with partial English translation, Application No. 2009-197005, Dated Apr. 2, 2013, 5 pages.
Japanese Office Action with partial English translation, Application No. 2009-197038, Dated Apr. 2, 2013, 4 pages.

* cited by examiner

*Primary Examiner* — Glenn Dayoan
*Assistant Examiner* — Melissa A Black
(74) *Attorney, Agent, or Firm* — Rankin, Hill & Clark LLP

(57) ABSTRACT

A vehicle body includes hollow left and right side sills. Front ends of the side sills are formed into closed cross sections and substantially inverted-L shapes. The front end of the right side sill is bilaterally symmetrical to the front end of the left side sill. Rear ends of the left and right side sills are formed into substantially square-shaped cross sections. Portions from the front ends to the rear ends of the side sills are formed into closed cross sections which change smoothly from the inverted-L shaped cross sections to the square-shaped cross sections.

14 Claims, 12 Drawing Sheets

VEHICLE BODY STRUCTURE

FIELD OF THE INVENTION

The present invention relates to a body structure for a passenger vehicle or the like.

BACKGROUND OF THE INVENTION

Left and right side sills of a vehicle body are positioned on the left and right sides of the vehicle body, and the side sills extend in a longitudinal direction. Requirements of the left and right side sills in all of the following three cases are that it be possible to guarantee a certain strength, and also that it be possible to guarantee collision force absorbing performance. The first is a case of a so-called front-surface collision, in which collision force acts on the front surface of the vehicle. The second is a case of a so-called rear-surface collision, in which a collision force acts on the rear surface of the vehicle. The third is a case of a so-called side collision, in which collision force acts on the side surface in the width direction of the vehicle.

For example, when the vehicle undergoes a side collision, it is possible that the collision force from the side could act on a center pillar extending upward from a longitudinally intermediate point of the side sill. The collision force being transferred from the center pillar to the side sill causes the side sill to twist into the passenger compartment. The center pillar collapses into the passenger compartment along with the twisting of the side sill. Such collapsing of the center pillar is preferably suppressed as much as possible.

A technique whereby the strength of the left and right side sills is increased is known from Japanese Patent Publication No. 3159231. In the technique known from Japanese Patent Publication No. 3159231, the left and right side sills are configured from hollow members having uniform cross sections, and the side sills have side sill reinforcing members inside the front half portions of the side sills. The cross sections of the side sills are closed cross sections having substantially square shapes. The strength of the side sill reinforcing members gradually decreases from the front of the side sills to the rear. Therefore, when the vehicle undergoes a front-surface collision, stress concentration in the side sills can be prevented.

When a common vehicle undergoes a front-surface collision, the front part of the vehicle body deforms to the rear, whereby the front wheels move rearward together with the front part of the vehicle body and come in contact with the front ends of the side sills. At this time, the front wheels are not limited to coming in contact with the entire surfaces of the side sill front ends.

As described above, in the technique known from Japanese Patent Publication No. 3159231, the front ends of the side sills are formed into closed cross sections having substantially square shapes. The square-shaped closed cross sections are composed of four sides: a vertical inner upright side positioned near the center of the vehicle width direction, a top lateral side extending outward in the vehicle width direction from the top end of the inner upright side, an outer upright side extending downward from the distal end of the top lateral side, and a bottom lateral side extending to the bottom end of the inner upright side from the bottom end of the outer upright side. A front wheel that has collapsed backward has a high possibility of coming in contact with only the inner upright side and the top lateral side. In other words, the front wheel has a high possibility of partially coming in contact with the front end of the side sill. In this case as well, there are requirements that the side sill have greater collision force absorbing performance and that the strength of the side sill be ensured. Moreover, weight reduction of the vehicle has also recently come to be a requirement.

In view of this, there is a demand for a technique which makes it possible to reduce the weight of the left and right side sills while ensuring the strength of the left and right side sills.

SUMMARY OF THE INVENTION

According to the present invention, there is provided a vehicle body structure comprising: left and right side sills disposed on left and right sides of a vehicle body and extending longitudinally of the vehicle body; a floor panel spanning between the left and right side sills; left and right front pillars extending upward from front ends of the left and right side sills; and left and right center pillars extending upward from intermediate parts of lengths of the left and right side sills, wherein each of the left and right side sills is comprised of a hollow member and has a front end which is formed into a closed cross section and a substantially inverted-L shape, each of the inverted-L shapes is defined by an upright side part positioned on a vehicle widthwise center side and extending vertically, and a lateral side part extending horizontally outwardly in a vehicle widthwise direction from a top end of the upright side part, each of the left and right side sills has a rear end formed into a closed cross section and a substantially square shape, and an intermediate portion between the front end and the rear end of each side sill is formed into a closed cross section which smoothly varies from the inverted-L shaped cross section to the square-shaped cross section.

The front ends of the left and right side sills are formed not into square-shaped closed cross sections like the rear ends, but into closed cross sections and upside-down inverted-L shapes. In other words, the upside-down inverted-L shaped cross sections are cross sections contained within a range whereby there is a high possibility that the retracted front wheels will come in contact along with the rearward deformation of the front part of the vehicle body when the vehicle has undergone a front-surface collision. Therefore, when the retracted front wheels have come in contact with the front ends of the side sills during the front-surface collision of the vehicle, the collision force (external force) from the front of the vehicle can be borne throughout nearly the entire front ends of the side sills, or, in other words, throughout nearly their entire surfaces. Furthermore, the areas from the front ends to the rear ends of the left and right side sills are formed into closed cross sections which smoothly (gradually) change from upside-down inverted-L shaped cross sections to square-shaped cross sections. Therefore, external force that acts on the front ends is transferred in a substantially uniform manner through the entire periphery of the closed cross sections in any region from the front ends to the rear ends. Consequently, external force from the front is efficiently transferred from the front ends to the rear ends of the side sills, whereby the external force can be borne by the entire side sills. As a result, the performance of the side sills in absorbing the external force can be ensured while also ensuring the strength of the side sills. Moreover, since the external force can be borne by the entire side sills, excess thickness that does not bear the external force can be eliminated from the hollow side sills. In other words, the thickness of the side sills can be reduced. As a result, it is possible to reduce the weight of the vehicle body.

When the vehicle is subjected to a rear-surface collision, the collision force (external force) from the rear of the vehicle is transferred from the rear part of the vehicle body to the rear ends of the left and right side sills. This is why the rear ends of the left and right side sills are formed into square-shaped closed cross sections. Therefore, the performance of the side sills in absorbing rear external force can be ensured while also ensuring compression strength, bending strength, and twisting strength in the side sills.

When the vehicle is subjected to a side collision, the side sills act as though to twist due to the collision force (external force) from the side of the vehicle. This is why the area from the front ends to the rear ends of the left and right side sills are formed into closed cross sections which smoothly change from upside-down inverted-L shaped cross sections to square-shaped cross sections. Therefore, the performance of the side sills in absorbing the side external force can be ensured while also ensuring the twisting strength of the side sills.

Thus, the strength of the left and right side sills can be ensured, and their weight can be reduced.

Preferably, the floor panel includes vehicle-widthwise ends each positioned at a bottom end of the upright side part and having an inclined side part extending in an inclined fashion from the bottom end to a vehicle-widthwise outer end of the lateral side part. The inclined side part may be joined to the vehicle widthwise outer end of the lateral side part. Thus, when the vehicle undergoes a side collision, the external force from the side of the vehicle is transferred from the center pillars to the vehicle widthwise ends of the floor panel via the inclined parts, and then from the floor panel to other members. The twisting of the side sills into the passenger compartment due to the external force from the side is suppressed by the inclined side parts and the floor panel. Thus, the strength of the side sills can be increased because the side sills are reinforced by the inclined parts and the floor panel. Furthermore, the outward appearance of the side sills is improved because the areas between the bottom ends of the upright side parts and the vehicle widthwise outer ends of the lateral side parts are covered by the inclined parts.

Desirably, the vehicle body structure further comprises: a dashboard provided in an inner front part of the vehicle body, for partitioning a front part of a passenger compartment; and a front external force bearing member provided on the dashboard, for bearing a front external force acting on the vehicle body from forward and dispersing the external force to surrounding members. The front external force bearing member may be joined to the front ends of the left and right side sills.

When the vehicle undergoes a front-surface collision, frontal external force transferred from the front part of the vehicle body to the front external force support member is dispersed in a substantially uniform manner by the front external force support member to the surrounding members. Consequently, external force acting on the front ends from the front of the vehicle can be reduced due to the retracted front wheels coming in contact with the front ends of the side sills during a front-surface collision. Moreover, since the front external force support member is joined to the front ends of the left and right side sills, the twisting deformation of the front ends of the side sills can be suppressed. Therefore, the closed cross sections constituting the front ends of the side sills can be reduced in thickness, and the weight of the vehicle body can be reduced.

In a preferred form, the vehicle body structure further comprises: a cross member, positioned proximately to the left and right center pillars and extending in the vehicle widthwise direction, for linking the left and right side sills to each other; and left and right gussets joined to end parts of the cross member and to the left and right upright side parts. The cross member may be comprised of either a vehicle widthwise composite member configured by integrally combining divided members which are divided in the vehicle width direction, or a vehicle widthwise single member formed integrally without being divided in the vehicle width direction. Each of the left and right gussets may be comprised of a member capable of transferring a side external force acting on the vehicle body from outside in the vehicle widthwise direction from the left and right side sills to the cross member and is made weaker against the side external force than the left and right side sills and the cross member.

Since the left and right gussets are joined to both the ends of the cross member and the left and right upright side parts, when the vehicle undergoes a side collision, the external force from the side of the vehicle is transferred to the gussets and the cross member via the center pillars and the side sills. At this time, the external force from the side is absorbed due to the weakened gussets deforming (collapsing) sooner than the side sills or the cross member. As a result, since the bending deformation of the cross member is suppressed, the side sills joined to the cross member is kept from being twisted into the passenger compartment by the external force from the side. Since the twisting of the side sills is suppressed, the center pillars extending upward from the side sills can be kept from collapsing into the passenger compartment. Consequently, since there is less penetration when the center pillars collapse and penetrate into the passenger compartment due to a side collision, the space in the passenger compartment can be better ensured.

It is preferred that the vehicle body structure further comprise: left and right side sill reinforcing members extending longitudinally of the vehicle body along bottom ends of vehicle widthwise inside surfaces of the left and right upright side parts. The left and right side sill reinforcing members may be joined to the left and right upright side parts and may have top surfaces inclined so as to slope downward from outside to inside in the vehicle width direction. Bottom surfaces of the end parts of the cross member may be provided to incline along the top surfaces of the left and right side sill reinforcing members and be superposed on and joined to the top surfaces. Thus, the left and right side sill reinforcing members extending in the longitudinal direction of the vehicle body reinforce the left and right side sills by extending along the bottom ends of the vehicle widthwise inside surfaces of the left and right upright side parts. Therefore, the strength of the left and right side sills is increased. Moreover, the end parts of the cross member joined to the left and right upright side parts are reinforced by the left and right side sill reinforcing members. Therefore, it is possible to suppress the bending deformation of the end parts of the cross member, which accompanies the twisting action of the side sills.

It is also preferred that the left and right center pillars be reinforced by stiffeners, and bottom ends of the stiffeners be integrated with the vehicle widthwise ends of the floor panel. Thus, when the vehicle undergoes a side collision, it is possible for the floor panel to further suppress the collapsing of the center pillars and the stiffeners into the passenger compartment due to the external force from the side of the vehicle.

It is also preferred that the left and right center pillars be reinforced by the stiffeners and the floor panel have vehicle widthwise ends positioned at bottom ends of the upright side part, with inclined side parts extending from the bottom ends to vehicle widthwise outer ends of the lateral side parts and joined to the stiffeners. Thus, when the vehicle under goes a side collision, external force from the side of the vehicle is transferred from the center pillars to the stiffeners, then from the stiffeners to the vehicle widthwise ends of the floor panel via the inclined side parts, and finally from the floor panel to other members. The twisting of the side sills into the passenger compartment due to the side external force is suppressed by the inclined side parts and the floor panel. As a result, since there is less penetration when the center pillars collapse and penetrate into the passenger compartment due to a side collision, the space in the passenger compartment can be better ensured. Moreover, the strength of the side sills can be reduced because the twisting of the side sills is suppressed by the inclined side parts and the floor panel. The thickness of the side sills, for example, can be reduced proportionately. Thus, the strength of the side sills can be ensured, and the weight of the side sills can be reduced as well.

BRIEF DESCRIPTION OF THE DRAWINGS

Certain preferred embodiments of the present invention will be described in detail below, by way of example only, with reference to the accompanying drawings in which.

DETAILED DESCRIPTION OF THE PREFERRED EMBODIMENTS

Figure 1:
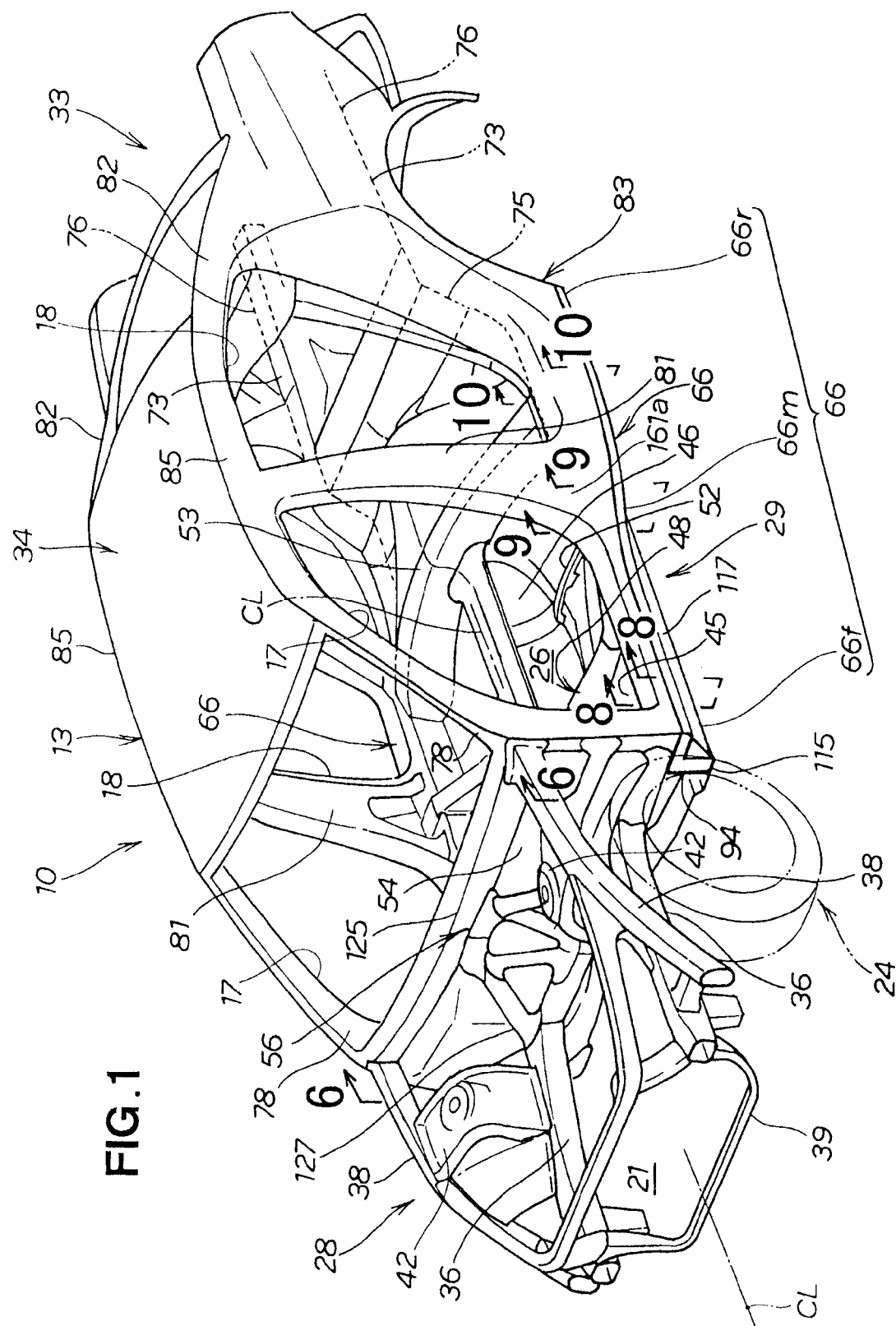
FIG. 1 is a perspective view showing a vehicle body according to the present invention.
Figure 2:
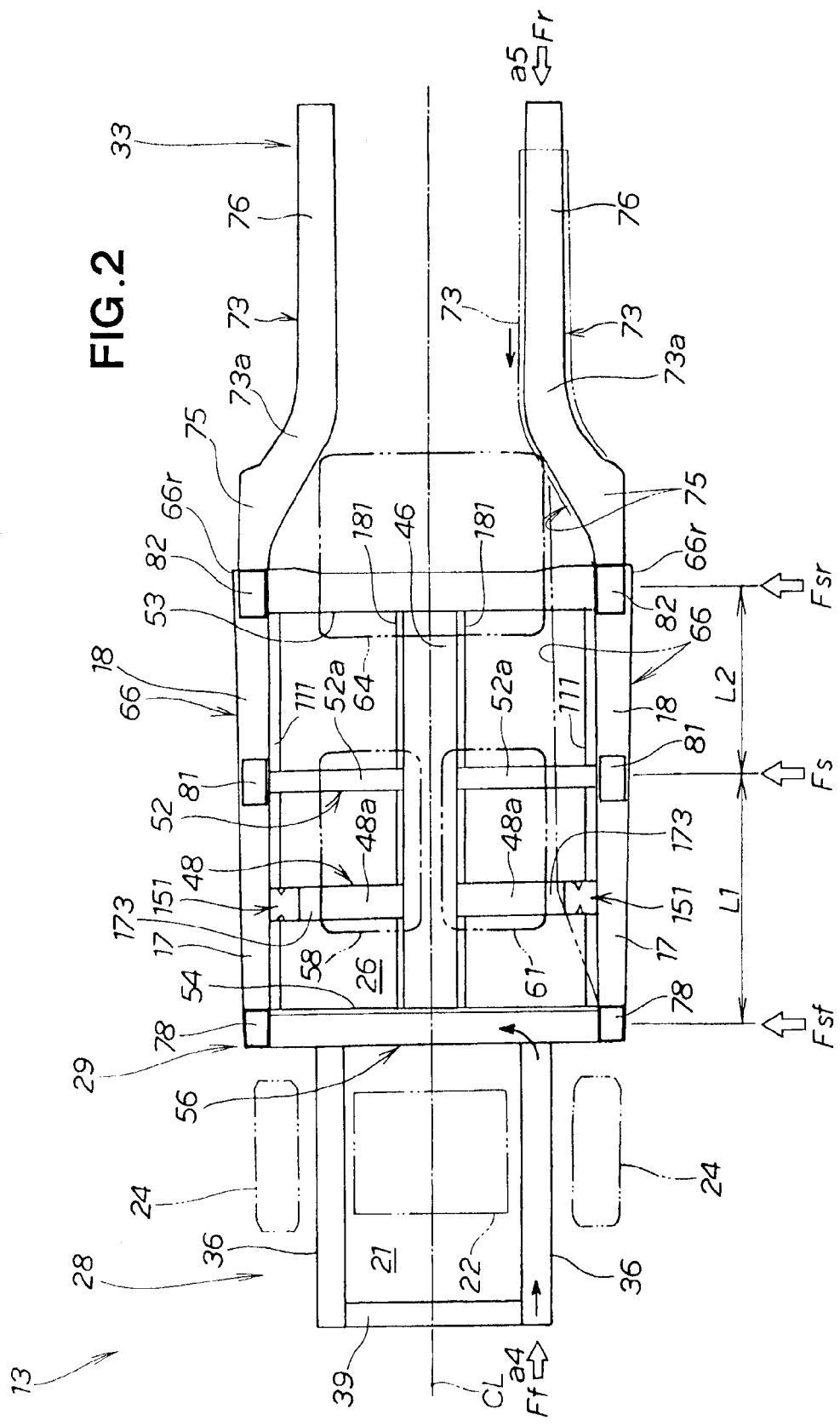
FIG. 2 is a top plan view showing a front part, a center part and a rear part of the vehicle body of FIG. 1.
Figure 3:
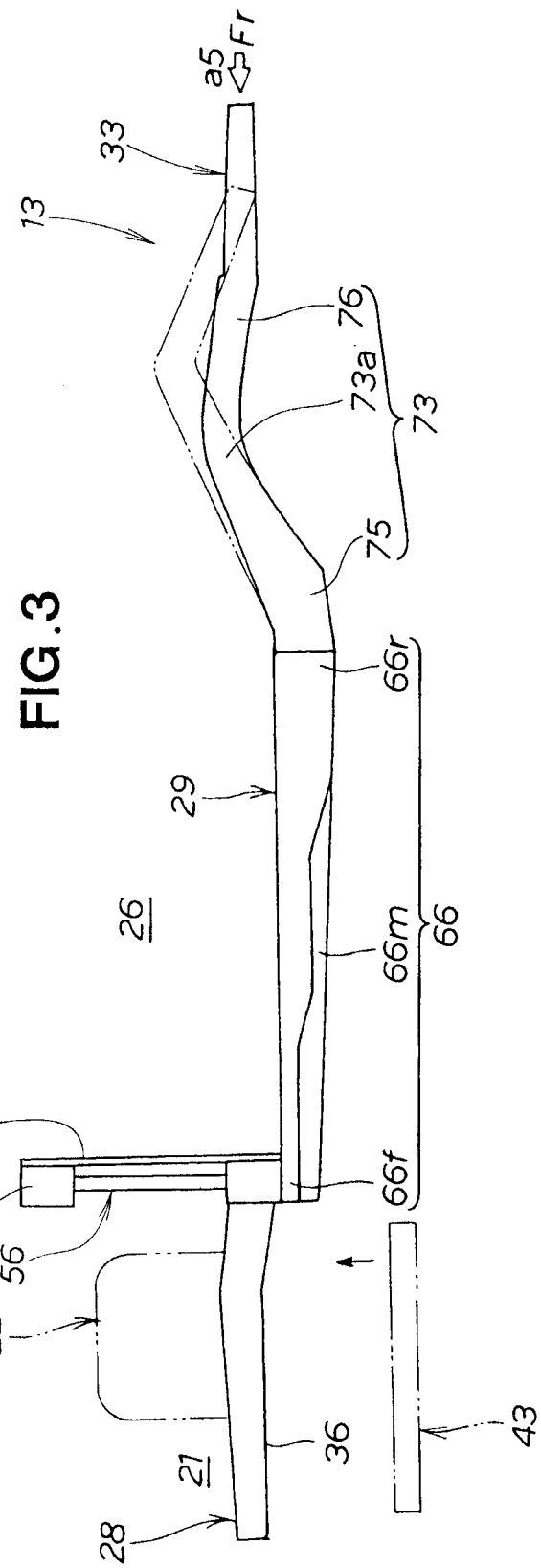
FIG. 3 is a side elevational view showing the vehicle body of FIG. 2.

A vehicle 10 is a four-door type passenger vehicle as shown in FIGS. 1, 2, and 3, wherein a front engine compartment 21 and a passenger compartment 26 located directly behind the engine compartment 21 are formed inside a vehicle body 13.

The vehicle body 13 is of a monocoque construction, and is formed into a bilaterally symmetrical shape about a vehicle width center line CL extending in the vehicle longitudinal direction through the widthwise center of the vehicle 10. The vehicle body 13 has front door openings 17, 17 and rear door openings 18, 18 in the left and right side surfaces. The front and rear door openings 17, 18 are opened and closed by doors (not shown). A power unit 22 is disposed in the engine compartment 21. The power unit 22 is composed of an engine and a transmission. Left and right front wheels 24, 24 are suspended on the left and right sides of a front part 28 of the vehicle body 13.

The front part 28 of the vehicle body 13 is a portion where the engine compartment 21 is formed in the inside. The front part 28 of the vehicle body 13 includes left and right front side frames 36, 36, left and right upper members 38, 38, and a front bulk head 39. The left and right front side frames 36, 36 are positioned on the left and right sides of the front part 28 of the vehicle body 13, and the frames extend in the longitudinal direction of the vehicle body 13. The left and right upper members 38, 38 are positioned above the left and right front side frames 36, 36, and these members extend in the longitudinal direction of the vehicle body 13. Left and right damper housings 42, 42 span between the left and right front side frames 36, 36 and the left and right upper members 38, 38. The front bulk head 39 is a substantially rectangular frame spanning between the front ends of the left and right front side frames 36, 36 and the front ends of the left and right upper members 38, 38. A sub-frame 43 on which the power unit 22 is mounted is attached from below to the front part 28 of the vehicle body 13, as shown in FIG. 3.

A center part 29 of the vehicle body 13 is a portion located directly behind the front part 28, where the passenger compartment 26 is formed in the inside. The center part 29 of the vehicle body 13 includes left and right side sills 66, 66, left and right front pillars 78, 78, left and right center pillars 81, 81, left and right rear pillars 82, 82, left and right roof side rails 85, 85, a roof 34, a floor panel 45, a floor tunnel 46, a dashboard 54, a front external force support member 56, and left and right side outer panels 83.

Figure 4:
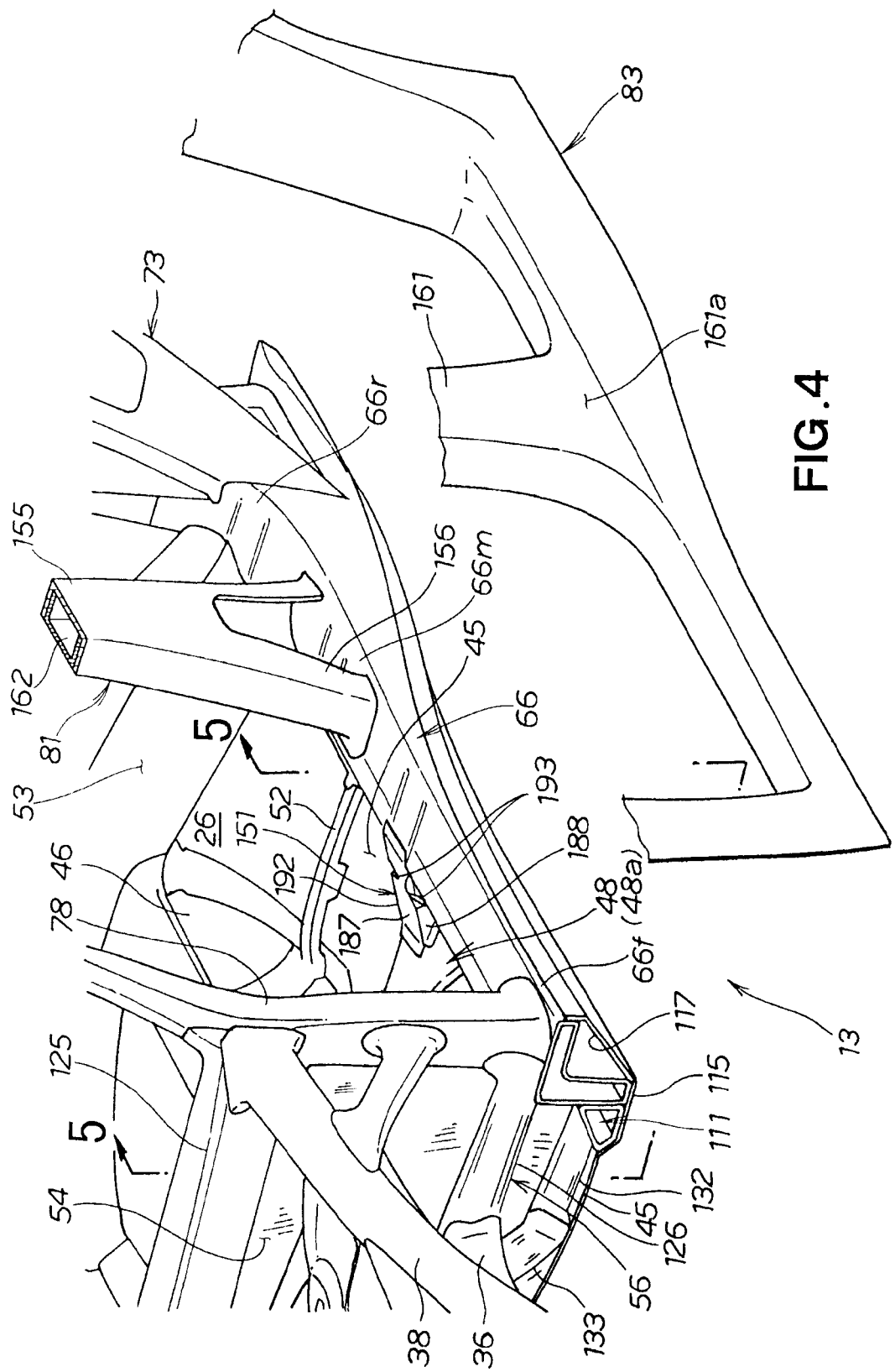
FIG. 4 is an exploded perspective view of a side outer panel in the periphery of a left side sill of the vehicle body of FIG. 1.

As shown in FIG. 4 as well, the left and right side outer panels 83 are members constituting the left and right outer panels of the center part 29 of the vehicle body 13, and these panels cover at least the left and right side sills 66, 66, the left and right front pillars 78, 78, the left and right center pillars 81, 81, the left and right rear pillars 82, 82, and the left and right roof side rails 85, 85.

The left and right side sills 66, 66 are positioned on the left and right sides of the vehicle body 13 and the sills extend in the longitudinal direction of the vehicle body 13, as shown in FIGS. 1, 2, and 3. The left and right front pillars 78, 78 extend upward from the front ends 66f of the left and right side sills 66, 66. The left and right center pillars 81, 81 extend upward from longitudinally intermediate points of the left and right side sills 66, 66. The left and right rear pillars 82, 82 extend upward from the rear ends 66r, 66r of the left and right side sills 66, 66.

The left and right roof side rails 85, 85 span between the top ends of the left and right front pillars 78, 78, the top ends of the left and right center pillars 81, 81, and the top ends of the left and right rear pillars 82, 82, as shown in FIG. 1. The roof 34 spans between the left and right roof side rails 85, 85.

Figure 5:
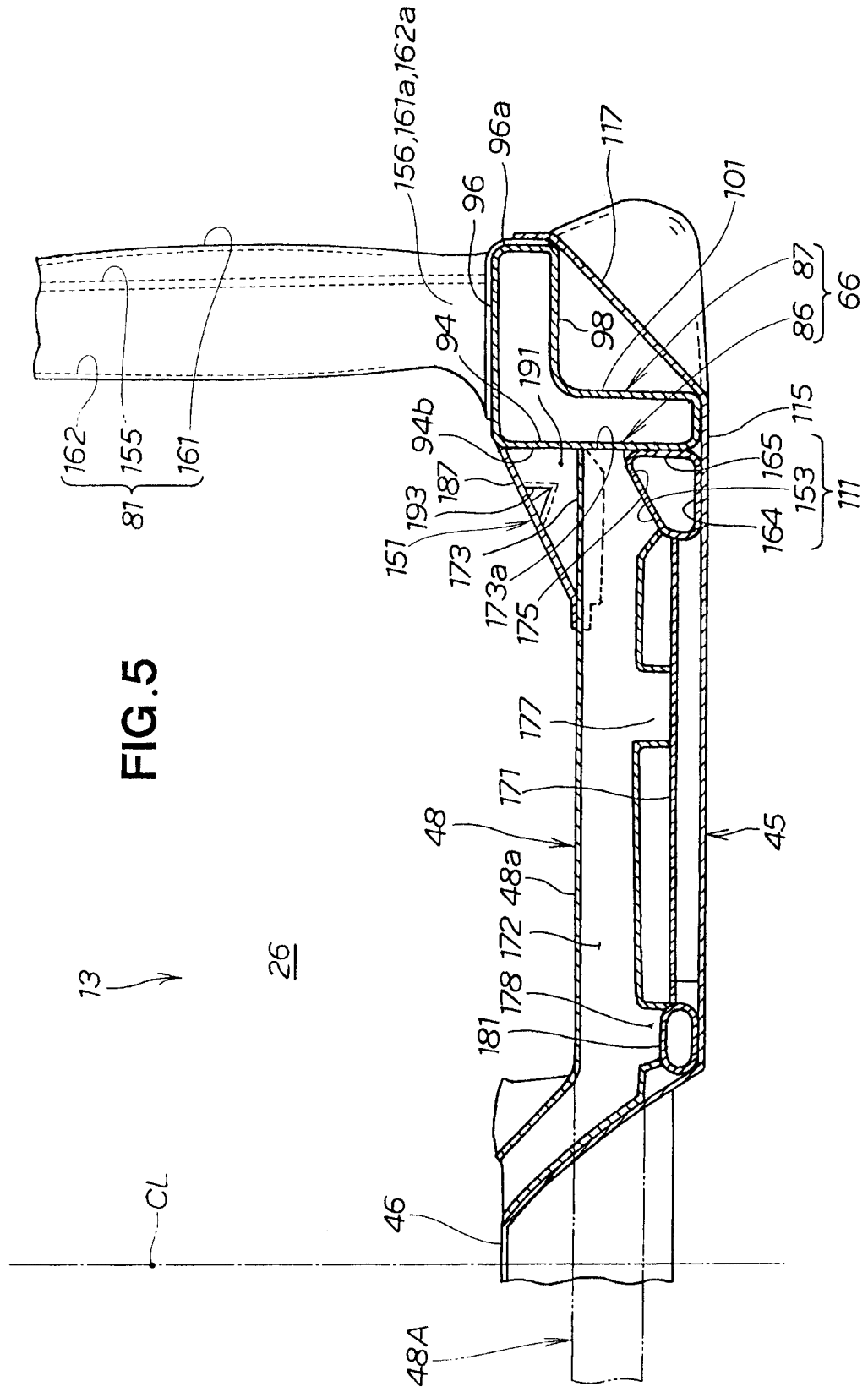
FIG. 5 is a cross-sectional view taken along line 5-5 of FIG. 4.

The floor panel 45 is a flat panel spanning between the left and right side sills 66, 66 as shown in FIGS. 1 and 5. The floor tunnel 46 is a portion that bulges up from the floor panel 45 into the passenger compartment 26, and is made to extend in the longitudinal direction of the vehicle body 13. The floor tunnel is formed into an upside-down substantial U shape in cross section, and is located in the widthwise center of the vehicle body 13 (along the vehicle width center line CL). The floor tunnel 46 is formed integrally with, for example, the floor panel 45.

The dashboard 54 is a wall for separating the engine compartment 21 from the passenger compartment 26, as shown in FIGS. 1, 2, and 3. The bottom end of the dashboard 54 is joined to the front end of the floor panel 45. The left and right ends of the dashboard 54 are joined to the left and right front pillars 78, 78.

The front external force support member 56 is provided to the dashboard 54, and is a member for bearing external force acting from the front of the vehicle body 13 and dispersing the external force to the surrounding members, e.g., the left and right side sills 66, (36 and the left and right front pillars 78, 78. The front external force support member is formed into a bilaterally symmetrical shape about the vehicle width center line CL. The front external force support member 56 is positioned along the front surface of the dashboard 54 and is joined to the rear ends of the left and right front side frames 36, 36, the rear ends of the left and right upper members 38, 38, the front ends 66*f*, 66*f* of the left and right side sills 66, 66, and the left and right front pillars 78, 78.

More specifically, the front external force support member 56 is composed of a top cross member 125, a center cross member 126, left and right outside reinforcing members 127, 127, left and right inside reinforcing members 131, 131, left and right bottom reinforcing members 132, 132, and left and right connecting members 133, 133.

The top cross member 125 extends in the vehicle width direction along the top end of the dashboard 54, and spans between the height-wise centers of the left and right front pillars 78, 78. The rear ends of the left and right upper members 38, 38 are joined to the left and right ends of the top cross member 125 and are thereby joined to the left and right front pillars 78, 78 via the top cross member 125.

The center cross member 126 extends in the vehicle width direction and spans between the bottom ends of the left and right front pillars 78, 78, and the center cross member 126 is joined to the front ends 66*f* of the left and right side sills 66, 66. The rear end of the left front side frame 36 is joined to a roughly center position 137 from the left end of the center cross member 126 up to the vehicle width center line CL. The rear end of the right front side frame 36 is joined to a roughly center position 138 from the right end of the center cross member 126 up to the vehicle width center line CL. Therefore, the rear ends of the left and right front side frames 36, 36 are joined to the left and right front pillars 78, 78 via the center cross member 126.

The top cross member 125 and the center cross member 126 are positioned substantially parallel across a predetermined gap from each other, and are configured into rough truss formations by combining the four reinforcing members 127, 127, 131, 131. The truss configurations are configurations in which both ends of all of the plurality of long, thin reinforcing members 127, 127, 131, 131 are joined in triangular shapes with the top cross member 125 and the center cross member 126. The reinforcing members 127, 127, 131, 131 to the top cross member 125 and the center cross member 126 are firmly joined by welding.

The bottom ends of the left and right inside reinforcing members 131, 131 are joined to a widthwise center position of the center cross member 126. The top ends of the left and right inside reinforcing members 131, 131 separate from each other in the vehicle width direction, and the top ends are joined to the top cross member 125. The left and right outside reinforcing members 127, 127 span between the positions where the left and right inside reinforcing members 131, 131 bond the top cross member 125 and the positions where the left and right front side frames 36, 36 bond the center cross member 126.

The left and right bottom reinforcing members 132, 132 span between the bottom end portions of the front ends 66*f* of the left and right side sills 66, 66, and the longitudinal center of the center cross member 126. More specifically, the top ends of the left and right bottom reinforcing members 132, 132 are joined to the center position of the center cross member 126. The bottom ends of the left and right bottom reinforcing members 132, 132 are joined to the front ends 66*f* of the left and right side sills 66, 66 via left and right side sill reinforcing members 111, 111.

The left and right connecting members 133, 133 span between center positions 137, 138 of the center cross member 126, and longitudinally center positions of the left and right bottom reinforcing members 132, 132.

The rear part 33 of the vehicle body 13 is a portion located directly behind the center part 29, and the rear part includes left and right rear frames 73, 73 as shown in FIGS. 1, 2, and 3. The left and right rear frames 73, 73 are members positioned on the left and right sides of the vehicle body 13 and extending in the longitudinal direction of the vehicle body 13, and are positioned farther upward and inward in the vehicle width direction than the left and right side sills 66, 66. The left and right rear frames 73, 73 are composed of front parts 75, 75 joined to the rear ends 66*r*, 66*r* of the left and right side sills 66, 66, curved parts 73*a*, 73*a* which curve rearward and upward and also inward in the vehicle width direction from the front parts 75, 75, and rear parts 76, 76 extending rearward from the curved parts 73*a*, 73*a*.

Three cross members 48, 52, 53 span between the left and right side sills 66, 66 as shown in FIGS. 1 and 2. The three cross members 48, 52, 53 are aligned substantially parallel to each other, positioned at intervals in the longitudinal direction of the vehicle body 13, and made to extend in the vehicle width direction.

A floor rear cross member 53 is a more rigid member than the other cross members 48, 52, and the floor rear cross member 53 bonds the rear ends 66*r*, 66*r* of the left and right side sills 66, 66 together. The floor tunnel 46 spans between the floor rear cross member 53 and the dashboard 54.

The floor center cross member 52 is positioned between the left and right center pillars 81, 81, and the floor center cross member 52 bonds the left and right side sills 66, 66 together.

The floor front cross member 48 is positioned between the left and right front pillars 78, 78 and the left and right center pillars 81, 81, or in other words is positioned in proximity to the left and right center pillars 81, 81, and the floor front cross member 48 bonds the left and right side sills 66, 66 together. The front part of a driver seat 58 and the front part of a passenger seat 61 are fixed to the floor front cross member 48. The rear part of the driver seat 58 and the rear part of the passenger seat 61 are fixed to the floor center cross member 52. A rear seat 64 is fixed to the middle cross member 53.

Figure 6:
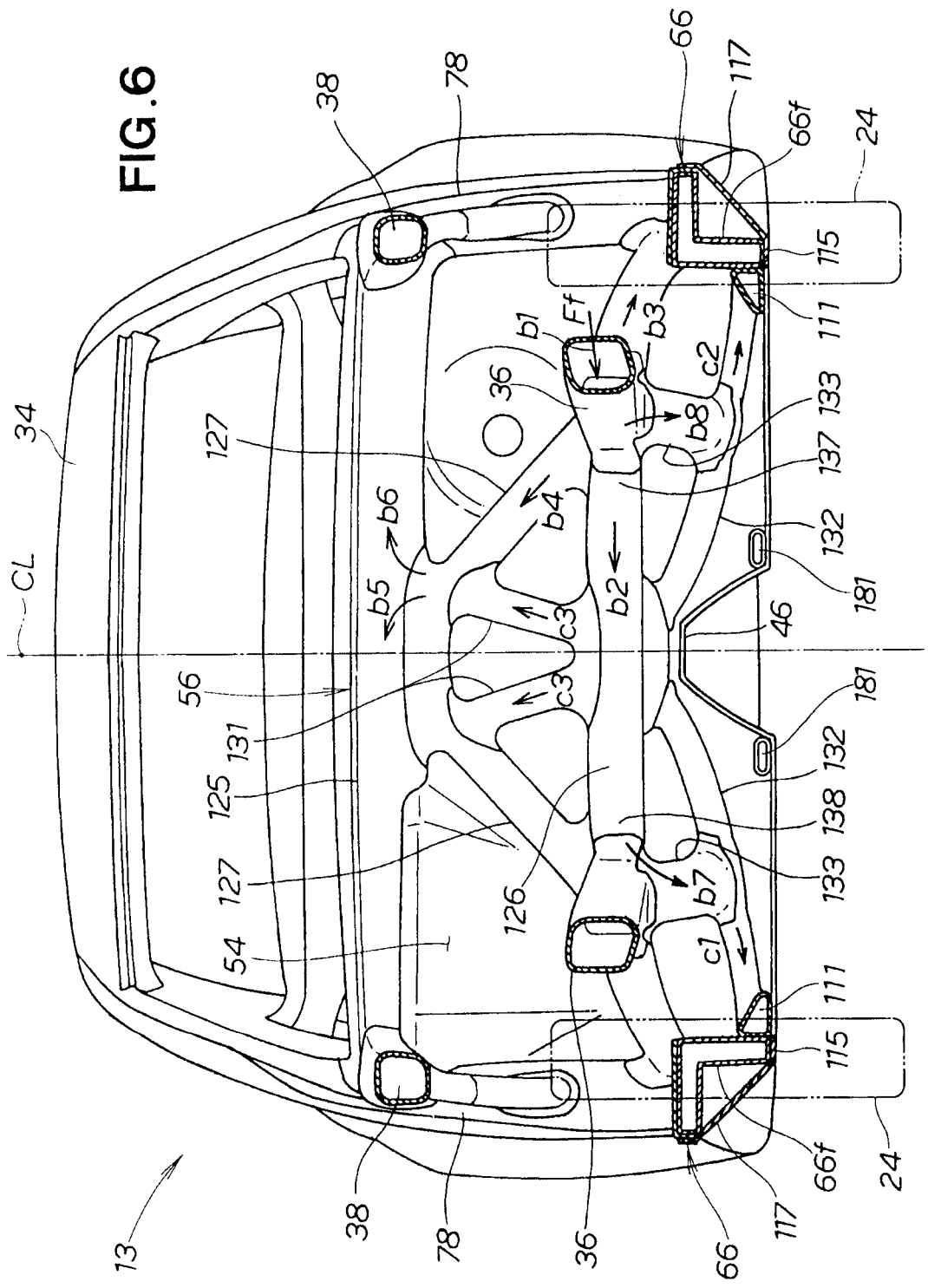
FIG. 6 is a cross-sectional view taken along line 6-6 of FIG. 1.

The left and right side sills 66, 66 are formed in bilateral symmetry about the vehicle width center line CL as shown in FIG. 6. The left side sill 66 is described in detail hereinbelow. The right side sill 66 has a configuration identical to the left side sill 66 and is therefore not described.

Figure 8:
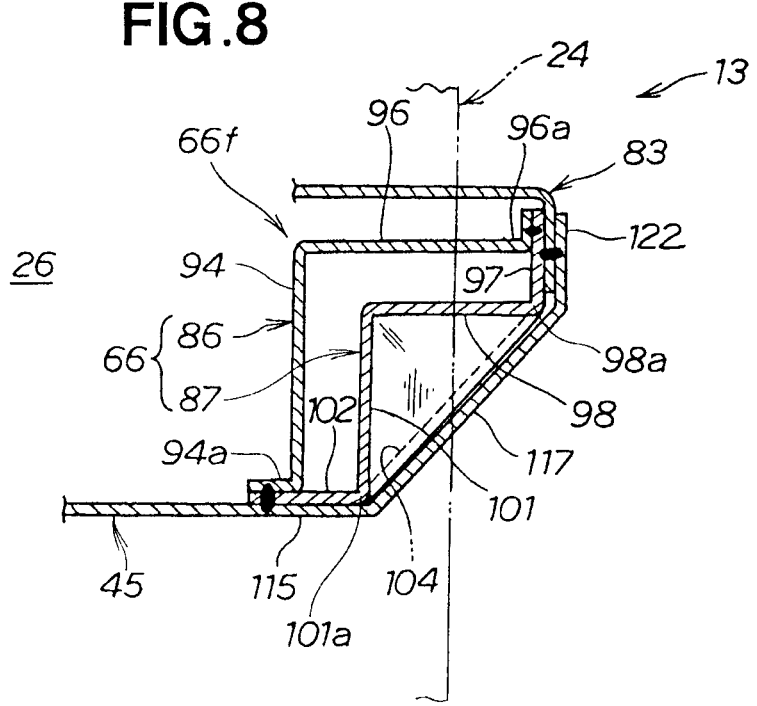
FIG. 8 is a cross-sectional view taken along line 8-8 of FIG. 1.
Figure 9:
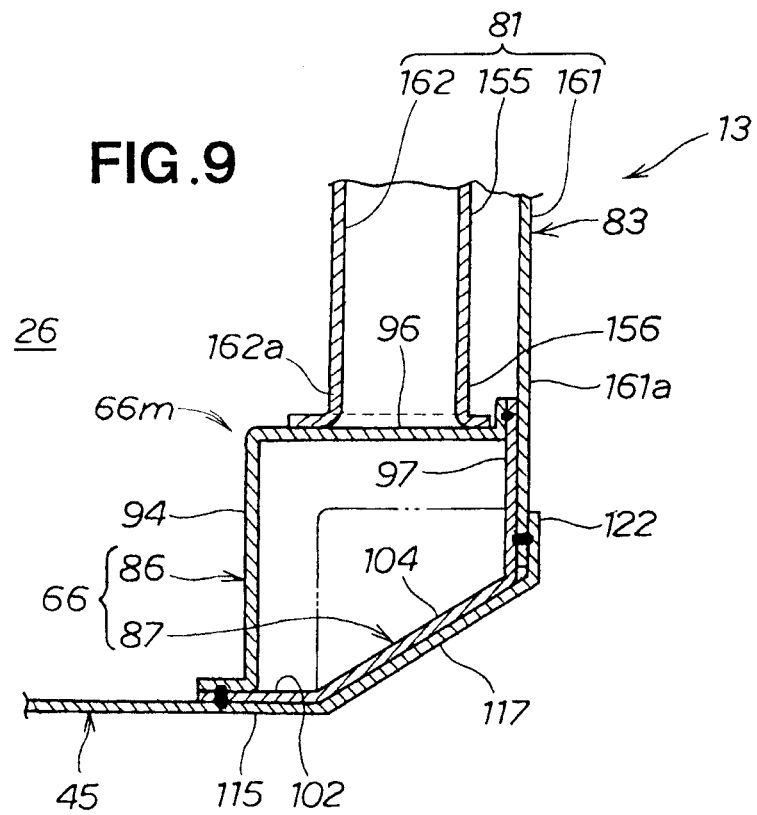
FIG. 9 is a cross-sectional view taken along line 9-9 of FIG. 1.
Figure 10:
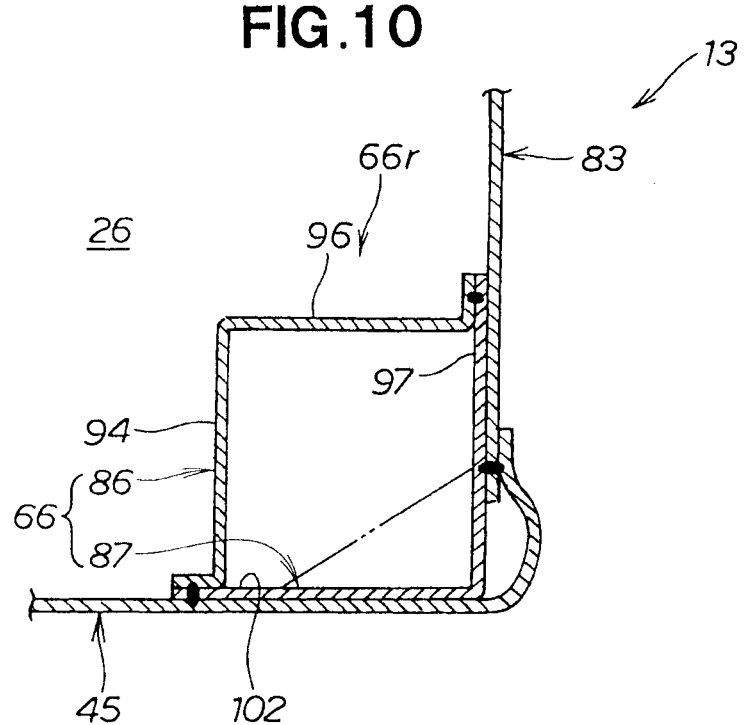
FIG. 10 is a cross-sectional view taken along line 10-10 of FIG. 1.

Examples of the configuration of the left side sill 66 include the following first configuration and second configuration, for example. The first configuration is a hollow member obtained by hydroforming a pipe-shaped element into a predetermined cross-sectional shape as shown in FIGS. 4 through 6. The second configuration is a hollow member formed into a predetermined cross-sectional shape by bonding together a plurality of plate-shaped press molds as shown in FIGS. 8 through 10. The details of the left side sill 66 are described using the second configuration shown in FIGS. 8 through 10 as an example.

The left side sill 66 is a hollow member composed of a side sill inner 86 positioned on the inside in the vehicle width direction, and a side sill outer 87 positioned on the outside in the vehicle width direction and joined to the side sill inner 86, as shown in FIG. 8. The side sill inner 86 and the side sill outer 87 are plate-shaped press molds. The side sill 66 is formed into a closed cross section by combining the side sill inner 86 and the side sill outer 87. The hollow side sill 66 is closed off at the front end 66*f* by a wall (not shown).

The cross-sectional shape of the side sill 66 differs in the longitudinal direction of the side sill 66 as shown in FIGS. 4 and 8 through 10. In other words, the front end 66*f* of the side sill 66 is formed into an upside-down substantially inverted-L shaped cross section. The rear end 66*r* of the side sill 66 is formed into a substantially square-shaped closed cross section. All of the interior angles of the square shape are preferably substantially right angles. The area 66*m* of the side sill 66 from the front end 66*f* to the rear end 66*r*, i.e., the center part 66*m* is formed into a closed cross section which smoothly changes from an upside-down inverted-L shaped cross section to a square-shaped cross section. As a result, the center part 66*m* is formed into a substantially pentagonal closed cross section.

More specifically, the cross-sectional shape of the side sill inner 86 is the same shape throughout the entire length of the side sill inner 86, and is formed into an upside down substantially inverted-L shaped cross section, as shown in FIGS. 8, 9, and 10. The side sill inner 86 is composed of a vertical inner upright side part 94 (inner wall panel 94) positioned near the center of the vehicle width direction, and a horizontal inner lateral side part 96 (top panel 96) extending outward in the vehicle width direction from the top end of the inner upright side part 94.

The front end of the side sill outer 87 is formed into an upside-down substantially inverted-L shaped cross section as shown in FIG. 8. The front end of the side sill outer 87 is composed of a vertical outer upright side part 101, and a horizontal outer lateral side part 98 extending outward in the vehicle width direction from the top end of the outer upright side part 101.

The outer upright side part 101 is positioned at a predetermined interval outward in the vehicle width direction from the inner upright side part 94, and is made to face the inner upright side part 94. A bottom end 101*a* of the outer upright side part 101 is superposed over and joined to a bottom end 94*a* of the inner upright side part 94 via a horizontal extension 102 which extends inward in the vehicle width direction from the bottom end 101*a*.

The outer lateral side part 98 is positioned at a predetermined interval toward the bottom of the vehicle body from the inner lateral side part 96, and is made to face the inner lateral side part 96. The distal end of the outer lateral side part 98 is superposed over and joined to the distal end of the inner lateral side part 96 via a vertical extension 97 extending upward from the distal end.

Thus, the front end 66*f* of the side sill 66 is formed into a closed cross section and also an upside-down substantially inverted-L shaped cross section by the vertical upright side parts 94, 101 positioned near the center in the vehicle width direction, and the horizontal lateral side parts 96, 98 extending outward in the vehicle width direction from the top ends of the upright side parts 94, 101.

The rear end of the side sill outer 87 is formed into a substantially bilaterally inverted inverted-L shaped cross section by the vertical extension 97 (outer wall panel 97) positioned outward in the vehicle width direction, the horizontal extension 102 (bottom panel 102) extending inward in the vehicle width direction from the bottom end of the extension 97, as shown in FIG. 10. In other words, the rear end of the side sill outer 87 eliminates the outer upright side part 101 and the outer lateral side part 98 shown in FIG. 4. Thus, the rear end 66*r* of the side sill 66 is formed into a substantially square-shaped closed cross section by the inner upright side part 94, the inner lateral side part 96, and the extensions 97, 102.

The area from the front end of the side sill outer 87 to the rear end (the center part) is formed so as to change smoothly from an upside-down inverted-L shaped cross section to a bilaterally inverted inverted-L shaped cross-section, as shown in FIG. 9. In other words, the center part is formed into a closed cross section by an outer inclined side part 104 bonding the extension 97 and the extension 102 together, in addition to the extension 97 and the extension 102. Thus, the center part 66*m* of the side sill 66 is formed by the upright side part 94, the lateral side part 96, the extensions 97, 102, and the outer inclined side part 104 into a closed cross section which changes smoothly from an upside-down inverted-L shaped cross-section to a square-shaped cross section.

An end 115 of the floor panel 45 in the vehicle width direction is positioned at the bottom ends 94*a*, 101*a* of the upright side parts 94, 101, and the end 115 has an inclined side part 117 extending at an incline from the bottom ends 94*a*, 101*a* to the outer ends 96*a*, 98*a* of the lateral side parts 96, 98 in the vehicle width direction, as shown in FIG. 8. A top end 122 of the inclined side part 117 is joined via the side outer panel 83 to an outer end 96*a* of the lateral side part 96 in the vehicle width direction and an outer end 98*a* (top end of the extension 97) of the lateral side part 98 in the vehicle width direction. The end 115 of the floor panel 45 in the vehicle width direction is joined to the bottom end 94*a* of the upright side part 94 and the bottom end 101*a* of the outer upright side part 101 (the distal end of the extension 102).

Figure 11:
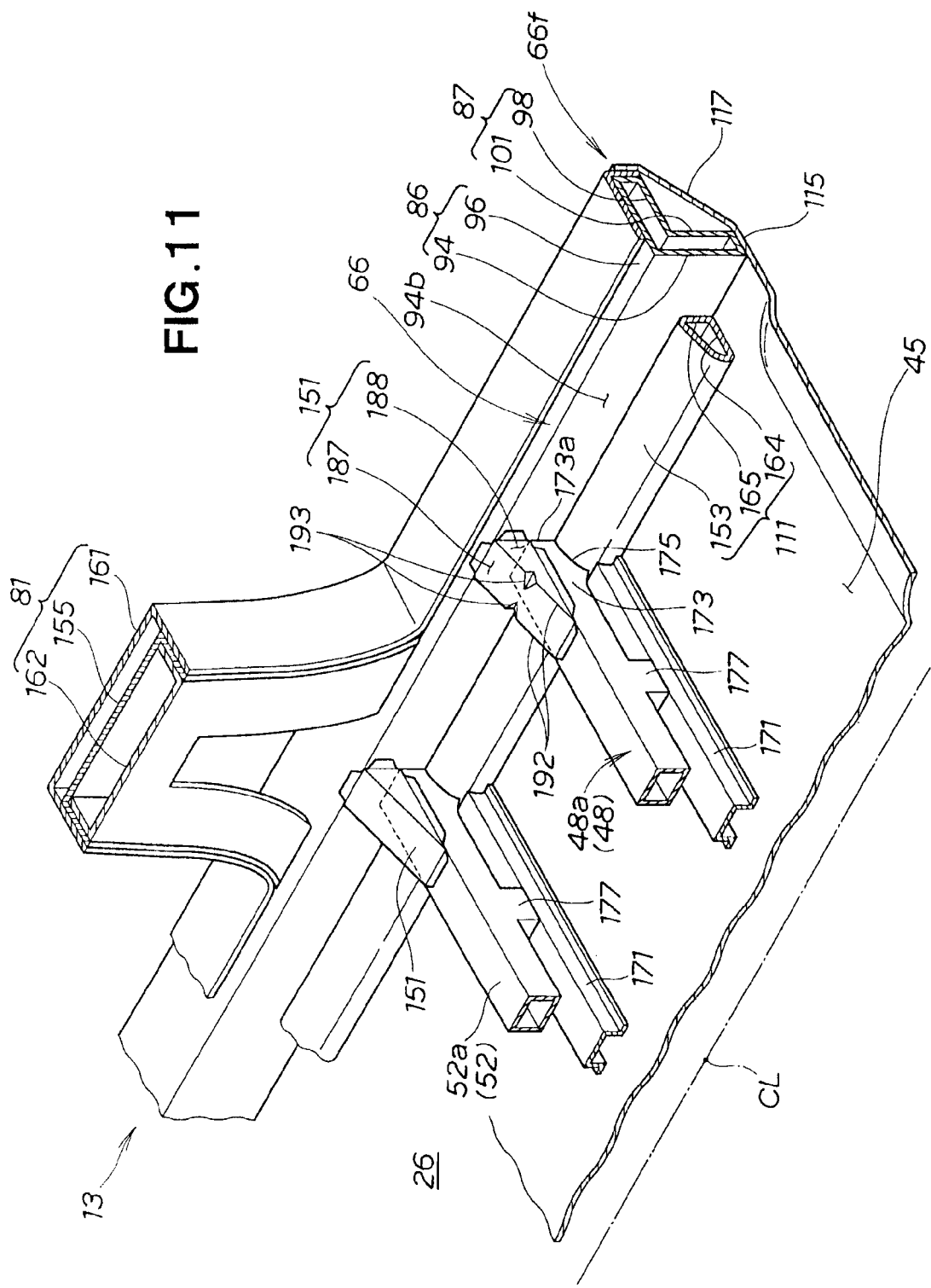
FIG. 11 is a perspective view showing, together with the left side sill, a floor front cross member, a center pillar, a side sill reinforcing member and a gusset of FIG. 5.

The center pillar 81 is composed of a pillar inner 162 to the inside in the vehicle width direction, and a pillar outer 161 superposed over the outside surface of the pillar inner 162 in the vehicle width direction, as shown in FIGS. 4, 5, and 11. The pillar outer 161 is formed on the side outer panel 83. The center pillar 81 is formed into a closed cross section by the pillar inner 162 and the pillar outer 161 being joined together. The center pillar 81 may also be formed into a predetermined cross-sectional shape by hydroforming a pipe-shaped element. A stiffener 155 is placed inside the closed cross section, i.e., between the pillar inner 162 and the pillar outer 161. As a result, the center pillar 81 is reinforced by the stiffener 155.

A bottom end part 161*a* of the pillar outer 161 is held between the extension 97 of the side sill 66 and the top end 122 of the inclined side part 117, as shown in FIG. 9. Thus, the top end 122 of the inclined side part 117 is joined to the side sill 66 and is also joined to the bottom end part 161*a* of the pillar outer 161.

A bottom end 156 of the stiffener 155 and a bottom end 162*a* of the pillar inner 162 are joined to the top surface of the inner lateral side part 96 of the side sill 66. Thus, the top end 122 of the inclined side part 117 is joined to the bottom end 156 of the stiffener 155 via the side sill 66. As a result, the bottom end 156 of the stiffener 155 is integrated with the end 115 of the floor panel 45 in the vehicle width direction.

The left and right side sills 66, 66 comprise left and right side sill reinforcing members 111, 111 which extend in the longitudinal direction of the vehicle body 13 along the bottom ends of vehicle widthwise inside surfaces 94*b* of the left and right upright side parts 94 (inner upright side parts 94), as shown in FIGS. 5, 6, and 11. The left and right side sill reinforcing members 111, 111 are extended from the front ends 66*f* to the rear ends 66*r* of the left and right side sills 66, 66 and are joined to the left and right upright side parts 94, 94, as shown in FIG. 2. The left and right side sill reinforcing members 111, 111 are omitted from FIGS. 8, 9, and 10.

The left and right side sill reinforcing members 111, 111 are formed in bilateral symmetry about the vehicle width center line CL, as shown in FIG. 6. The left side sill reinforcing member 111 is described in detail hereinbelow. The right side sill reinforcing member 111 has the same configuration as the left side sill reinforcing member 111 and is therefore not described.

The left side sill reinforcing member 111 is a hollow member formed into a substantially triangular closed cross section, as shown in FIGS. 5 and 11. This side sill reinforcing member 111 is composed of a horizontal bottom side part 164 superposed over and joined to the top surface of the floor panel 45, a reinforcing upright side member 165 rising up from the vehicle widthwise outside end of the bottom side part 164, and a top surface 153 extending from the top end of the reinforcing upright side member 165 to the vehicle widthwise end of the bottom side part 164. The top surface 153 of the side sill reinforcing member 111 is inclined to as to slope inward and downward from the vehicle widthwise outer side. The reinforcing upright side member 165 is superposed on and joined to the bottom end of the vehicle widthwise inside surface 94*b* of the inner upright side part 94.

The vehicle widthwise ends of the floor tunnel 46 which bulge out from the floor panel 45 are reinforced by left and right tunnel frames 181, 181, as shown in FIGS. 2, 5, and 6. The left and right tunnel frames 181, 181 extend in the longitudinal direction of the vehicle body along the bottom edges of the floor tunnel 46. The left and right tunnel frames 181, 181 are hollow members formed into closed cross sections which are flat on the top and bottom. The left and right tunnel frames 181, 181 are joined to the floor panel 45 and the floor tunnel 46.

The floor front cross member 48 is a composite member configured by integrally combining left and right divided members 48*a*, 48*a* which are divided in the vehicle width direction, as shown in FIGS. 2, 5, and 11. The left divided member 48*a* spans between the left side sill 66 and the floor tunnel 46. The right divided member 48*a* spans between the right side sill 66 and the floor tunnel 46. As a result, the left and right divided members 48*a*, 48*a* are integrally combined to each other via the floor tunnel 46.

The left and right divided members 48*a*, 48*a* are formed in bilateral symmetry about the vehicle width center line CL. The left divided member 48*a* is described in detail hereinbelow. The right divided member 48*a* has the same configuration as the left divided member 48*a* and is therefore not described.

The left divided member 48*a* is configured from a hollow member formed into a square-shaped closed cross section as shown in FIGS. 5 and 11. The left divided member 48*a* is separated upward from the horizontal floor panel 45 by a predetermined height, and is positioned in the height-wise center portion of the left side sill 66. A bottom surface 175 of one end part 173 of the left divided member 48*a* is formed into an inclined surface which is inclined along the top surface 153 of the left side sill reinforcing member 111. The one end part 173 is formed into a tapering shape due to the bottom surface 175 being inclined. A distal end surface 173*a* of the one end part 173 protrudes up to and is joined to the vehicle widthwise inside surface 94*b* of the inner upright side part 94. The bottom surface 175 of the one end part 173 is superposed over and joined to the top surface 153 of the side sill reinforcing member 111.

Thus, the one end parts 173, 173 (see FIGS. 2 and 5) of the left and right divided members 48*a*, 48*a*, i.e., the bottom surfaces 175 of both end parts 173, 173 of the floor front cross member 48 are inclined along the top surfaces 153 of the left and right side sill reinforcing members 111, 111, and are also superposed on and joined to the top surfaces 153.

Directly below the left divided member 48*a*, a lower cross member 171 is disposed spanning between the left side sill reinforcing member 111 and the left tunnel frame 181. The lower cross member 171 is formed into a groove-shaped cross section in which the bottom side is open. The lower cross member 171 is positioned separated downward from the left divided member 48*a* by a predetermined distance, and is superposed over and joined to the floor panel 45.

The divided member 48*a* has a first connecting part 177 and a second connecting part 178 extending toward the floor panel 45. The first and second connecting parts 177, 178 are hollow members formed into closed cross sections. The bottom end of the first connecting part 177 is joined to a longitudinally intermediate part of the lower cross member 171. The bottom end of the second connecting part 178 is joined to the top part of the tunnel frame 181.

Thus, the lower cross member 171 is positioned separated by a predetermined distance from the divided member 48*a*, and the lower cross member 171 supplements the reinforcing of the divided member 48*a*. Since the lower cross member 171 is separated at a gap from the divided member 48*a*, the floor front cross member 48 can be reduced in weight more so than if the divided member 48*a* and the lower cross member 171 were configured from a single member.

The floor front cross member 48 may be a single member, i.e., a single unit that is not divided in the vehicle width direction by the floor tunnel 46. A floor front cross member 48A configured from a single unit passes through the floor tunnel 46 as shown by the imaginary lines in FIG. 5. The configuration of both ends 173, 173 (see FIGS. 2 and 5) of the floor front cross member 48 is substantially the same as that of the composite unit even if the floor front cross member 48 is a single unit.

Both ends 173, 173 of the floor front cross member 48, i.e., the top surfaces of the one ends 173, 173 of the left and right divided members 48*a*, 48*a* are set to be lower than the top surfaces of the left and right side sills 66, 66, as shown in FIGS. 2, 5, and 11. The upper corner between both ends 173, 173 of the floor front cross member 48 and the left and right inner upright side parts 94, 94 is reinforced by left and right gussets 151, 151. The left and right gussets 151, 151 are members capable of transferring external force Fs (see FIG. 2) acting on the vehicle body 13 from the vehicle widthwise outside to the floor front cross member 48 from the left and right side sills 66, 66. The left and right gussets 151, 151 are joined to both ends 173, 173 of the floor front cross member 48 as well as the inner upright side parts 94, 94.

The left and right gussets 151, 151 are formed in bilateral symmetry about the vehicle width center line CL. The left gusset 151 is described in detail hereinbelow. The right gusset 151 has the same configuration as the left gusset 151 and is therefore not described.

Figure 12:
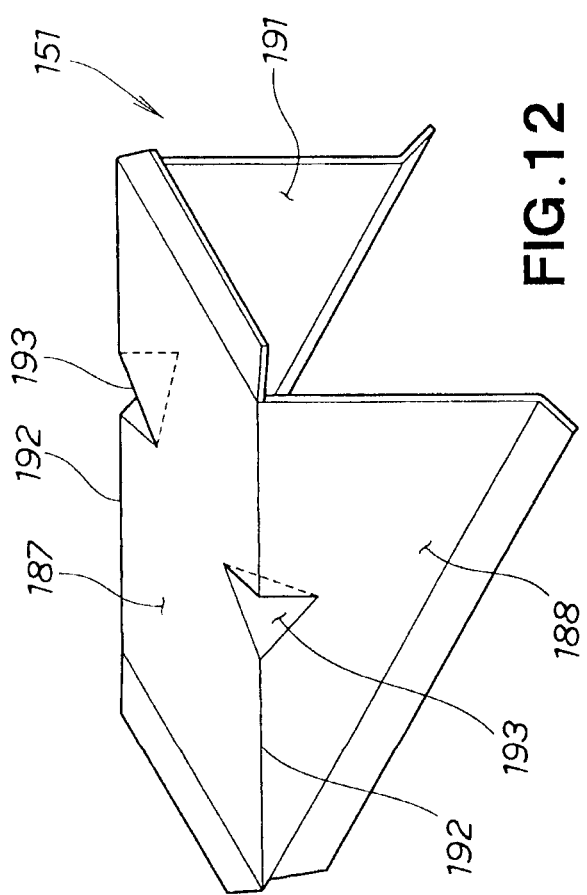
FIG. 12 is a perspective view of the gusset of FIG. 11.

The left gusset 151 is a press-molded article of a plate material, formed into a substantially upside-down U shape which opens at the bottom, and composed of an inclined panel 187, a front panel 188, and a rear panel 191, as shown in FIGS. 5, 11, and 12. The inclined panel 187 is a flat plate-shaped member which extends downward from the top end of the left inner upright side part 94 toward the top surface of the one end part 173 of the left divided member 48*a*. The front panel 188 and the rear panel 191 are right-triangle-shaped flat plates enclosed by the vertical vehicle-widthwise inside surface 94*b* of the left inner upright side part 94, the horizontal top surface of the one end part 173 of the left divided member 48a, and the inclined top edge of the inclined panel 187. The front panel 188 is continuous with the top edge on the front side of the inclined panel 187. The rear panel 191 is continuous with the top edge of the rear side of the inclined panel 187.

The vehicle widthwise ends of the inclined panel 187 are superposed on and joined to the top surface of the divided member 48a and the inner lateral side part 96, respectively. The bottom ends of the front panel 188 and the rear panel 191 are superposed on and joined to the side surfaces of the divided member 48a. The vertical side ends of the front panel 188 and the rear panel 191 are superposed on and joined to the vehicle widthwise inside surface 94b of the inner upright side part 94.

The left and right gussets 151, 151 are weaker against external force Fs (see FIG. 2) than the left and right side sills 66, 66 and the floor front cross member 48. More specifically, each gusset 151 is weakened by having concave parts 193, 193 formed respectively in a corner part 192 (ridge part 192) between the inclined panel 187 and the front panel 188, and in a corner part 192 (ridge part 192) between the inclined panel 187 and the rear panel 191. The concave parts 193, 193 are configured as being recessed into the gusset 151. The concave parts 193, 193 are configured from substantially V-shaped grooves formed in the corner parts 192, 192 so as to be orthogonal to the ridge parts 192, 192, for example. The bottoms of the V-shaped grooves are positioned toward the inside of the gusset 151. The position, shape, and size of the concave parts 193, 193 are optimally designed in view of the extent of the weakening.

The floor center cross member 52 has substantially the same configuration as the floor front cross member 48, as shown in FIGS. 2 and 11. The floor center cross member 52 is a composite member configured by integrally combining left and right divided members 52a, 52a, which are divided in the vehicle width direction by the floor tunnel 46. The floor center cross member 52 may be a single member, i.e., a single unit that is not divided in the vehicle width direction by the floor tunnel 46. The floor center cross member 52 configured by this single unit passes through the floor tunnel 46.

A lower cross member 171 is positioned underneath the floor center cross member 52. The top corners located between the ends of the floor center cross member 52 and the left and right inner upright side parts 94, 94 are reinforced by gussets which are substantially identical to the left and right gussets 151, 151 described above. Concave parts 193, 193 are optional in the gussets 151, 151 for reinforcing the floor center cross member 52.

The vehicle body 13 having the configuration described above is summarized as follows.

The front ends 66f of the left and right side sills 66, 66 are formed not into square-shaped closed cross sections like the rear ends 66r, but into closed cross sections and upside-down inverted-L shapes, as shown in FIGS. 1, 2, and 6. The cross sections of the upside-down inverted-L shapes are cross sections contained within a range whereby there is a high possibility that the retracted front wheels 24, 24 will come in contact along with the rearward deformation of the front part 28 of the vehicle body 13 when the vehicle 10 has undergone a front-surface collision (see arrow a4 in FIG. 2). Therefore, when the retracted front wheels 24, 24 have come in contact with the front ends 66f of the side sills 66, 66 during the front-surface collision of the vehicle 10, the collision force Ff (external force Ff) from the front of the vehicle shown in FIG. 2 can be borne throughout nearly the entire front ends 66f of the side sills 66, 66, or, in other words, throughout nearly their entire surfaces.

Furthermore, the areas from the front ends 66f to the rear ends 66r of the left and right side sills 66, 66 are formed into closed cross sections which smoothly (gradually) change from upside-down inverted-L shaped cross sections to square-shaped cross sections. Therefore, external force Ff that acts on the front ends 66f is transferred in a substantially uniform manner through the entire periphery of the closed cross sections in any region from the front ends 66f to the rear ends 66r. Consequently, external force Ff from the front is efficiently transferred from the front ends 66f to the rear ends 66r of the left and right side sills 66, 66, whereby the external force Ff can be borne by the entire side sills 66, 66. As a result, the performance of the side sills 66, 66 in absorbing the external force Ff can be ensured while also ensuring the strength of the side sills 66, 66. Moreover, since the external force Ff can be borne by the entire side sills 66, 66, excess thickness that does not bear the external force Ff can be eliminated from the hollow side sills 66, 66. In other words, the side sills 66, 66 can be thinned. As a result, it is possible to reduce the weight of the vehicle body 13.

When the vehicle 10 undergoes a rear-surface collision as shown in FIGS. 1, 2, and 3, the collision force Fr (external force Fr) from the rear of the vehicle is transferred from the rear part 33 of the vehicle body 13 to the rear ends 66r of the left and right side sills 66, 66, as shown in FIGS. 1, 2, and 3. This is why the rear ends 66r of the left and right side sills 66, 66 are formed into square-shaped closed cross sections. Therefore, the performance of the side sills 66, 66 in absorbing rear external force Fr can be ensured while also ensuring compression strength, bending strength, and twisting strength in the side sills 66, 66. Similarly, when the vehicle 10 undergoes a side collision, the performance of the side sills 66, 66 in absorbing a side collision force Fs (external force Fs) can be ensured.

For example, when another vehicle collides with the rear end of the left rear frame 73 (see arrow a5), stress is concentrated between the curved part 73a and the front part 75 of this rear frame 73 by the external force Fr from behind the vehicle. In other words, the external force Fr from the rear is absorbed by the rear frame 73 bendably deforming upward, as shown by the imaginary lines. In this case, the rear end 66r of the left side sill 66 can be bendably deformed a large amount by the external force Fr from the rear. Moreover, the rear end 66r of the side sill 66 is formed into a substantially square-shaped closed cross section as shown in FIG. 10. Therefore it is possible to guarantee reaction force in the side sill 66 against force acting so as to bend the rear end 66r. In other words, it is possible to guarantee the performance of the side sills 66, 66 in absorbing the rear external force Fr while also guaranteeing compression strength, bending strength, and twisting strength in the side sills 66, 66.

Figure 13:
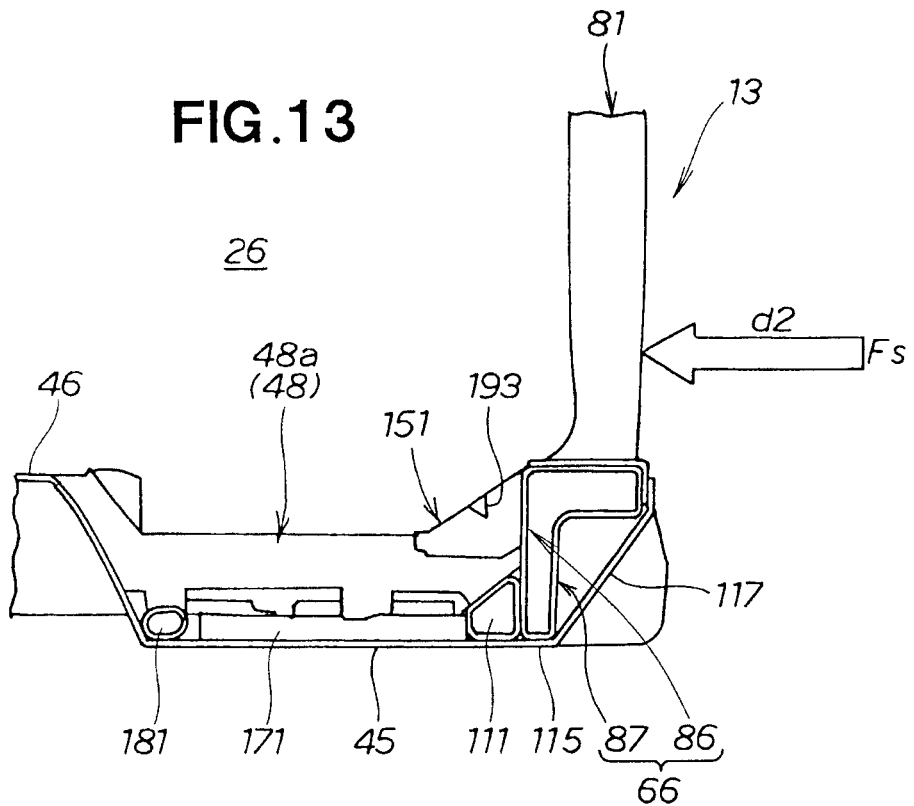
FIG. 13 is a schematic view showing an operation of the vehicle of FIG. 5 as the vehicle has undergone a side collision.

When the vehicle 10 is in a side collision, the side sill 66 acts as though to twist due to the collision force Fs (external force Fs) from the side of the vehicle, as shown in FIG. 13. This is why the area from the front end 66f to the rear end 66r of the side sill 66, i.e., the center part 66m, is formed into a closed cross section which smoothly changes from an upside-down inverted-L shaped cross section to a square-shaped cross section, as shown in FIGS. 4 and 9. In other words, the center part 66m is formed not into a simple square-shaped closed cross section, but into a substantially pentagonal closed cross section due to having an inclined side part 104. Therefore, when the vehicle 10 undergoes a side collision, the center part 66m deforms into a diamond shape less readily than if it were formed into a simple square-shaped closed cross section. Consequently, the performance of the side sill 66 in absorbing the side external force Fs can be ensured while also ensuring the twisting strength of the side sill 66.

The distance L1 from the front pillars 78 to the center pillars 81 is designed to be greater than the distance L2 from center pillars 81 to the floor rear cross member 53, as shown in FIG. 2. When another vehicle collides with the left center pillar 81 of the vehicle body 13 (see arrow a2), for example, the left side sill 66 begins to deform into the passenger compartment 26 due to the side external force Fs, as shown by the imaginary lines. At this time, the side force (front force component) acting on the front external force support member 56 from the front end 66f of the side sill 66 (see FIG. 3) is denoted as "Fsf." The side external force (rear force component) acting on the floor rear cross member 53 from the rear end 66r of the side sill 66 is denoted as "Fsr" (Fs=Fsf+Fsr). The rear force component Fsr is a value inversely proportional to the ratio between the distance L1 and the distance L2, and is greater than the front force component Fsf. This is why the rear end 66r of the side sill 66 is formed into a square-shaped closed cross section. Therefore, bending strength can be sufficiently ensured in the rear end 66r of the side sill 66.

Thus, the strength of the left and right side sills 66, 66 can be ensured, and their weight can be reduced.

The floor panel 45 also has an inclined side part 117 which has a vehicle widthwise end 115 positioned on the bottom ends 94a, 101a of the upright side parts 94, 101, and which extends at an incline from the bottom ends 94a, 101a to the vehicle widthwise outer ends 96a, 98a of the lateral side parts 96, 98, as shown in FIG. 8. The inclined side part 117 is joined to the vehicle widthwise outer ends 96a, 98a of the lateral side parts 96, 98.

Figure 14:
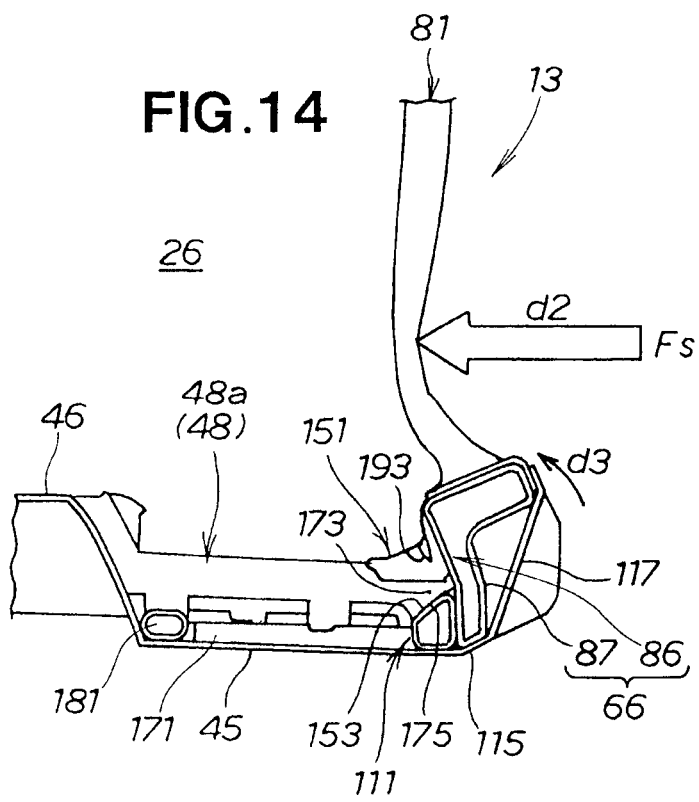
FIG. 14 is a schematic view showing deformation of a side part of the vehicle body of FIG. 13 by the side collision.

Therefore, when the vehicle 10 (see FIG. 1) undergoes a side collision, the external force Fs from the side of the vehicle is transferred from the center pillar 81 to the vehicle widthwise end 115 of the floor panel 45 via the inclined side part 117 as shown in FIG. 13, and is further transferred from the floor panel 45 to other members (for example, the cross members 48, 52, 53 shown in FIG. 2). The inclined side part 117 and the floor panel 45 suppress the twisting of the side sill 66 into the passenger compartment 26 by the external force Fs from the side of the vehicle, as shown in FIG. 14. Thus, since the side sill 66 is reinforced by the inclined side part 117 and the floor panel 45, the strength of the side sill 66 increases. Furthermore, the outward appearance of the side sill 66 is improved because the area between the bottom ends 94a, 101a of the upright side parts 94, 101 and the vehicle widthwise outer ends 96a, 98a of the lateral side parts 96, 98 is covered by the inclined side part 117.

The vehicle body 13 also comprises the floor front cross member 48 and the gusset 151, as shown in FIG. 5. The gusset 151 is weaker than the side sill 66 and the floor front cross member 48 against external force Fs (see FIG. 13) acting on the vehicle body 13 from the outside in the vehicle width direction. The gusset 151 is joined to both the end part 173 of the floor front cross member 48 and the inner upright side part 94.

Therefore, when the vehicle 10 (see FIG. 1) undergoes a side collision as shown in FIG. 13, the external force Fs from the side of the vehicle is transferred to the gusset 151 and the floor front cross member 48 via the center pillar 81 and the side sill 66. At this time, the external force Fs from the side is absorbed due to the weakened gusset 151 deforming (collapsing) sooner than the side sill 66 or the floor front cross member 48, as shown in FIG. 14. As a result, since the bending deformation of the floor front cross member 48 is suppressed, the side sill 66 joined to the floor front cross member 48 is suppressed from being twisted into the passenger compartment 26 by the external force Fs from the side. Since the twisting of the side sill 66 is suppressed, the center pillar 81 extending upward from the side sill 66 can be kept from collapsing into the passenger compartment 26. Consequently, since there is less penetration when the center pillar 81 collapses and penetrates into the passenger compartment 26 due to a side collision, the space in the passenger compartment 26 can be better ensured.

For example, when another vehicle collides as indicated by arrow d2 with the widthwise side surface of the vehicle 10 (see FIG. 1) as shown in FIG. 14, or, in other words, when a side collision occurs, external force Fs acts on the vehicle body 13 from the outside in the vehicle width direction. The center pillar 81 begins to collapse toward the passenger compartment 26 due to the side external force Fs. At this time, the gusset 151 is pressed and caused to collapse along with the twisting of the side sill 66 as indicated by arrow d3, and the gusset 151 compressibly deforms. In other words, the gusset 151 absorbs the external force Fs. At this time, the compressive force (external force Fs) acting on the concave parts 193 of the gusset 151 increases. Therefore, before the floor front cross member 48 begins to deform, and also before the deformation of the side sill 66 increases, the gusset 151 compressibly deforms beginning at the concave parts 193. As a result, the floor front cross member 48 disperses the twisting force (external force Fs) acting on the side sill 66 without compressibly deforming. Moreover, when the side sill 66 begins to twist as indicated by arrow d3, the bottom surface 175 of one end 173 of the floor front cross member 48 pushes against the top surface 153 of the side sill reinforcing member 111. At this time, the bottom surface 175 is stopped by the top surface 153, and the deformation of the one end part 173 of the floor front cross member 48 can therefore be further suppressed.

The top surface 153 of the side sill reinforcing member 111 is inclined so as to slope inward and downward from the vehicle widthwise outside, as shown in FIG. 11. The bottom surface 175 of the end part 173 of the floor front cross member 48 is inclined along the top surface 153 of the left and right side sill reinforcing members 111, and is also superposed on and joined to the top surface 153. Thus, the side sill reinforcing member 111, which extends in the longitudinal direction of the vehicle body 13, runs along the bottom edge of the vehicle widthwise inside surface 94b of the inner upright side part 94, thereby reinforcing the side sill 66. Therefore, the strength of the side sill 66 is increased. Moreover, the end part 173 of the floor front cross member 48 joined to the inner upright side part 94 is also reinforced by the side sill reinforcing member 111. Therefore, it is possible to suppress the bending deformation of the end part 173 of the floor front cross member 48, which accompanies the twisting action of the side sill 66.

The center pillar 81 is also reinforced by the stiffener 155 as shown in FIGS. 5 and 9. The floor panel 45 has the inclined side part 117 whose vehicle widthwise end 115 is positioned on the bottom ends 94a, 101a of the upright side parts 94, 101, the inclined side part 117 extending from the bottom ends 94a, 101a to the vehicle widthwise outer ends 96a, 98a of the lateral side parts 96, 98, as shown in FIG. 8. The inclined side part 117 is joined to the stiffener 155. In other words, the bottom end 156 of the stiffener 155 is integrated with the vehicle widthwise end 115 of the floor panel 45.

Therefore, when the vehicle 10 undergoes a side collision as shown in FIG. 13, the external force Fs from the side of the vehicle is transferred from the center pillar 81 to the stiffener 155, then from the stiffener 155 to the vehicle widthwise end 115 of the floor panel 45 via the inclined side part 117, and finally from the floor panel 45 to other members (e.g., the side sill reinforcing member 111). The twisting of the side sill 66 into the passenger compartment 26 due to the external force Fs from the side is suppressed by the inclined side part 117 and the floor panel 45, as shown in FIG. 14. As a result, since there is less penetration when the center pillar 81 collapses and penetrates into the passenger compartment 26 due to a side collision, the space in the passenger compartment 26 can be better ensured. Moreover, the strength of the side sill 66 can be reduced because the twisting of the side sill 66 is suppressed by the inclined side part 117 and the floor panel 45. The thickness of the side sill 66, for example, can be reduced proportionately. Thus, the strength of the side sill 66 can be ensured, and the weight of the side sill 66 can be reduced as well.

Figure 7:
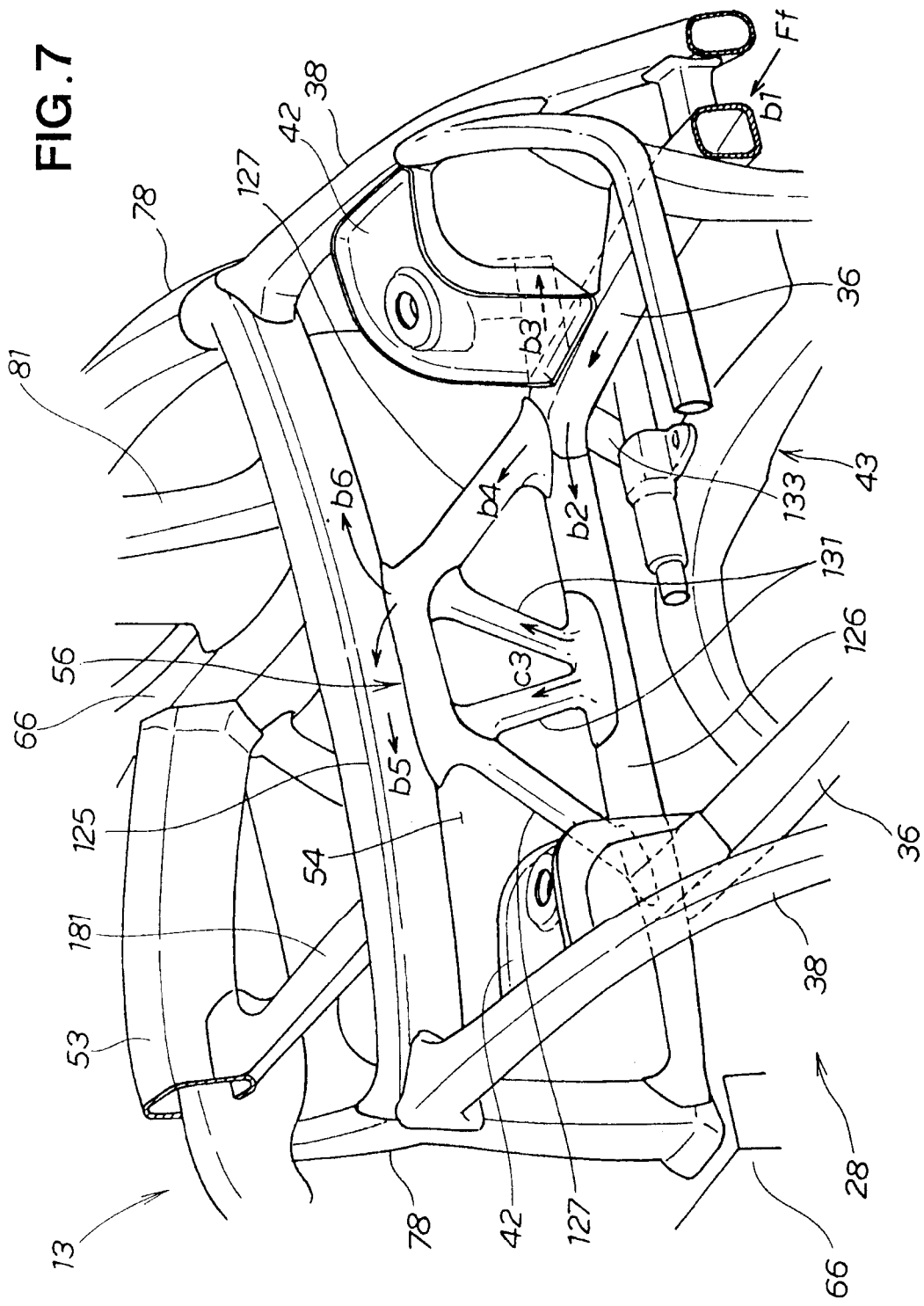
FIG. 7 is a perspective view showing a dashboard and a front external force support member of FIG. 6.

The vehicle body 13 also comprises the front external force support member 56 joined to the front ends 66f of the left and right side sills 66, 66, as shown in FIGS. 6 and 7. Therefore, when the vehicle 10 (see FIG. 1) undergoes a front-surface collision, the external force Ff from the front of the vehicle, which is transferred from the front part 28 of the vehicle body 13 to the front external force support member 56, is dispersed by the front external force support member 56 in a substantially uniform manner to the surrounding members, e.g., the left and right front pillars 78, 78 and the left and right side sills 66, 66.

For example, when another vehicle collides with the front end of the left front side frame 36 (a front-surface collision occurs) as shown in FIG. 2, the external force Ff from the front acts on the front end as indicated by arrow a4. At this time, the external force Ff is transferred to the left front side frame 36 as indicated by arrow b1 as shown in FIGS. 6 and 7. The external force Ff is further transferred from the rear end of the front side frame 36 to the center cross member 126, and is dispersed to the longitudinal sides of the center cross member 126, the left outside reinforcing member 127, and the left and right connecting members 133, 133 as indicated by arrows b2, b3, b4, b7, b8.

Furthermore, the external force Ff is dispersed from the center cross member 126 to the left and right front pillars 78, 78 (see arrows b2, b3), and is transferred from the center cross member 126 to the top cross member 125 via the left and right inside reinforcing members 131, 131 as indicated by arrows c3, c3.

Furthermore, the external force Ff is transferred from the left outside reinforcing member 127 to the top cross member 125 (see arrow b4) and also from the left and right inside reinforcing members 131, 131 to the top cross member 125 (see arrows c3, c3), and the external force Ff is dispersed to the longitudinal sides of the top cross member 125 and transferred to the left and right front pillars 78, 78 as indicated by arrows b5, b6.

Furthermore, the external force Ff is transferred from the left and right connecting members 133, 133 to the left and right bottom reinforcing members 132, 132, and is dispersed to the left and right side sills 66, 66 via the left and right side sill reinforcing members 111, 111 as indicated by arrows c1, c2.

Thus, the external force Ff from the front is dispersed by the front external force support member 56 to the left and right front pillars 78, 78 and the left and right side sills 66, 66. Consequently, the retracted front wheels 24, 24 come in contact with the front ends 66f, 66f of the side sills 66, 66, whereby the external force Ff from the front of the vehicle acting on the front ends 66f can be reduced.

Moreover, since the front external force support member 56 is joined to the front ends 66f of the left and right side sills 66, 66, the twisting deformation of the front ends 66f of the side sills 66, 66 can be suppressed. Therefore, the closed cross sections constituting the front ends 66f of the left and right side sills 66, 66 can be thinned, and the weight of the vehicle body 13 can be reduced.

In the present invention, the configuration may be such that the inclined side part 117 is configured from a member separate from the floor panel 45 and is joined to the floor panel 45.

The other end of the gusset 151 is joined to the upright side part 94 (inner upright side part 94) of the side sill 66, but may also be joined to the inner lateral side part 96 in proximity to the inner upright side part 94.

The vehicle body structure of the present invention is suitable for use in a vehicle body of a passenger vehicle or another vehicle.

Obviously, various minor changes and modifications of the present invention are possible in light of the above teaching. It is therefore to be understood that within the scope of the appended claims the invention may be practiced otherwise than as specifically described.

What is claimed is:

1. A vehicle body structure comprising:
left and right side sills disposed on left and right sides of a vehicle body and extending longitudinally of the vehicle body;
a floor panel spanning between the left and right side sills;
left and right front pillars extending upward from front ends of the left and right side sills; and
left and right center pillars extending upward from intermediate parts of lengths of the left and right side sills,
wherein each of the left and right side sills is comprised of a hollow member and has the front end formed into a closed cross section and a substantially inverted-L shape, the front ends of the left and right side sills being parts of the left and right side sills which bear a load exerted from vehicle front wheels during a front-surface collision,
each of the inverted-L shapes is defined by an upright side part positioned on a vehicle widthwise center side and extending vertically, and a lateral side part extending horizontally outwardly in a vehicle widthwise direction from a top end of the upright side part,
the intermediate parts of the lengths of the left and right side sills have a closed cross section and a substantially pentagonal shape,
each of the left and right side sills has a rear end formed into a closed cross section and a substantially square shape, the rear ends of the left and right side sills being connected together by a floor rear cross member extending in the vehicle widthwise direction,
a distance from the left and right center pillars to the rear ends of the left and right side sills is smaller than a distance from the left and right center pillars to the front ends of the left and right side sills, and
an intermediate portion is disposed between the front end and the rear end of each of the left and right side sills near said intermediate part of each of said left and right side sills from which said left and right center pillars upwardly extend, said intermediate portion being formed into a closed cross section which smoothly varies from the inverted-L shaped cross section to the square-shaped cross section.

2. The vehicle body structure of claim 1, wherein the floor panel includes vehicle-widthwise ends each positioned at a bottom end of the upright side part and having an inclined side part extending in an inclined fashion from the bottom end to a vehicle-widthwise outer end of the lateral side part, and the inclined side part is joined to the vehicle widthwise outer end of the lateral side part.

3. The vehicle body structure of claim 1, further comprising:
- a dashboard provided in an inner front part of the vehicle body, for partitioning a front part of a passenger compartment; and
- a front external force bearing member provided on the dashboard, for bearing a front external force acting on the vehicle body from forward and dispersing the external force to surrounding members,
- wherein the front external force bearing member is joined to the front ends of the left and right side sills.

4. The vehicle body structure of claim 1, further comprising:
- a cross member, positioned proximately to the left and right center pillars and extending in the vehicle widthwise direction, for linking the left and right side sills to each other; and
- left and right gussets joined to end parts of the cross member and to the left and right upright side parts,
- wherein the cross member is comprised of either a vehicle widthwise composite member configured by integrally combining divided members which are divided in the vehicle width direction, or a vehicle widthwise single member formed integrally without being divided in the vehicle width direction, and
- each of the left and right gussets is comprised of a member capable of transferring a side external force acting on the vehicle body from outside in the vehicle widthwise direction from the left and right side sills to the cross member and is made weaker against the side external force than the left and right side sills and the cross member.

5. The vehicle body structure of claim 4, further comprising:
- left and right side sill reinforcing members extending longitudinally of the vehicle body along bottom ends of vehicle widthwise inside surfaces of the left and right upright side parts,
- wherein the left and right side sill reinforcing members are joined to the left and right upright side parts and have top surfaces inclined so as to slope downward from outside to inside in the vehicle width direction, and
- bottom surfaces of the end parts of the cross member are inclined along the top surfaces of the left and right side sill reinforcing members and are superposed on and joined to the top surfaces.

6. The vehicle body structure of claim 4, wherein the left and right center pillars are reinforced by stiffeners, and bottom ends of the stiffeners are integrated with the vehicle widthwise ends of the floor panel.

7. The vehicle body structure of claim 1, wherein the left and right center pillars are reinforced by the stiffeners, the floor panel has vehicle widthwise ends positioned at bottom ends of the upright side part, with inclined side parts extending from the bottom ends to vehicle widthwise outer ends of the lateral side parts and joined to the stiffeners.

8. The vehicle body structure of claim 1, further comprising left and right rear pillars extending upward from the rear ends of the left and right side sills.

9. The vehicle body structure of claim 8, wherein the floor panel includes vehicle-widthwise ends each positioned at a bottom end of the upright side part and having an inclined side part extending in an inclined fashion from the bottom end to a vehicle-widthwise outer end of the lateral side part, and the inclined side part is joined to the vehicle widthwise outer end of the lateral side part.

10. The vehicle body structure of claim 8, further comprising:
- a dashboard provided in an inner front part of the vehicle body, for partitioning a front part of a passenger compartment; and
- a front external force bearing member provided on the dashboard, for bearing a front external force acting on the vehicle body from forward and dispersing the external force to surrounding members,
- wherein the front external force bearing member is joined to the front ends of the left and right side sills.

11. The vehicle body structure of claim 8, further comprising:
- a cross member, positioned proximately to the left and right center pillars and extending in the vehicle widthwise direction, for linking the left and right side sills to each other; and
- left and right gussets joined to end parts of the cross member and to the left and right upright side parts,
- wherein the cross member is comprised of either a vehicle widthwise composite member configured by integrally combining divided members which are divided in the vehicle width direction, or a vehicle widthwise single member formed integrally without being divided in the vehicle width direction, and
- each of the left and right gussets is comprised of a member capable of transferring a side external force acting on the vehicle body from outside in the vehicle widthwise direction from the left and right side sills to the cross member and is made weaker against the side external force than the left and right side sills and the cross member.

12. The vehicle body structure of claim 11, further comprising:
- left and right side sill reinforcing members extending longitudinally of the vehicle body along bottom ends of vehicle widthwise inside surfaces of the left and right upright side parts,
- wherein the left and right side sill reinforcing members are joined to the left and right upright side parts and have top surfaces inclined so as to slope downward from outside to inside in the vehicle width direction, and
- bottom surfaces of the end parts of the cross member are inclined along the top surfaces of the left and right side sill reinforcing members and are superposed on and joined to the top surfaces.

13. The vehicle body structure of claim 11, wherein the left and right center pillars are reinforced by stiffeners, and bottom ends of the stiffeners are integrated with the vehicle widthwise ends of the floor panel.

14. The vehicle body structure of claim 8, wherein the left and right center pillars are reinforced by the stiffeners, the floor panel has vehicle widthwise ends positioned at bottom ends of the upright side part, with inclined side parts extending from the bottom ends to vehicle widthwise outer ends of the lateral side parts and joined to the stiffeners.

* * * * *